(12) United States Patent  (10) Patent No.: US 8,997,068 B1
Kanungo et al. (45) Date of Patent: Mar. 31, 2015

(54) METHOD AND SYSTEM FOR PROVIDING AN IMPLICIT UNKNOWN VALUE TO USER ENUM DATA CONSTRUCTS IN AN HDL SYSTEM TO MODEL POWER SHUTOFF IN SIMULATION

(71) Applicant: Cadence Design Systems, Inc., San Jose, CA (US)

(72) Inventors: Abhishek Kanungo, Nashua, NH (US); Phil Giangarra, Medway, MA (US); Yonghao Chen, Groton, MA (US); Franz Erich Marschner, Ellicott City, MD (US)

(73) Assignee: Cadence Design Systems, Inc., San Jose, CA (US)

( * ) Notice: Subject to any disclaimer, the term of this patent is extended or adjusted under 35 U.S.C. 154(b) by 4 days.

(21) Appl. No.: 13/952,099

(22) Filed: Jul. 26, 2013

Related U.S. Application Data

(62) Division of application No. 12/640,601, filed on Dec. 17, 2009, now Pat. No. 8,775,150.

(51) Int. Cl.
*G06F 9/44* (2006.01)
*G06F 11/36* (2006.01)

(52) U.S. Cl.
CPC .................................... *G06F 8/30* (2013.01)
USPC .......................................................... 717/140

(58) Field of Classification Search
CPC ........ G06F 8/30; G06F 8/315; G06F 11/3608
See application file for complete search history.

(56) References Cited

U.S. PATENT DOCUMENTS

| | | | |
|---|---|---|---|
| 6,279,149 B1 * | 8/2001 | Field et al. ..................... | 717/129 |
| 7,346,486 B2 * | 3/2008 | Ivancic et al. .................. | 703/22 |
| 7,774,376 B1 * | 8/2010 | Meijer et al. ................... | 707/802 |
| 7,774,764 B2 * | 8/2010 | Metzger et al. ................ | 717/143 |
| 7,836,428 B2 * | 11/2010 | Mitchell et al. ............... | 717/117 |
| 8,131,532 B2 * | 3/2012 | Cadambi et al. ................ | 703/22 |
| 2004/0049764 A1 * | 3/2004 | Bloch et al. .................... | 717/116 |

OTHER PUBLICATIONS

Duley et al., A program differencing algorithm for verilog HDL, Sep. 2010, 10 pages.*
Khatchadourian et al., Enumeration refactoring: a tool for automatically converting Java constants to enumerated types, Sep. 2010, 2 pages.*

* cited by examiner

*Primary Examiner* — Thuy Dao
(74) *Attorney, Agent, or Firm* — Rosenberg, Klein & Lee (57) ABSTRACT

A method and system are provided for automatically creating an implicit literal value in a user defined enumerated data type by inserting an additional literal value, scanning the HDL design files for broken interdependencies or potential incompatibilities with the implicitly defined literal value, and modifying the HDL design files to be in accordance with the implicitly defined literal value while maintaining the semantics of the VHDL language reference model.

6 Claims, 3 Drawing Sheets

METHOD AND SYSTEM FOR PROVIDING AN IMPLICIT UNKNOWN VALUE TO USER ENUM DATA CONSTRUCTS IN AN HDL SYSTEM TO MODEL POWER SHUTOFF IN SIMULATION

RELATED APPLICATIONS

This application is a Divisional patent application of application Ser. No. 12/640,601, filed on 17 Dec. 2009, now pending. The entire disclosure of the prior application Ser. No. 12/640,601, from which an oath or declaration is supplied, is considered a part of the disclosure of the accompanying Divisional application and is hereby incorporated by reference.

BACKGROUND OF THE INVENTION

1. Field of the Invention

The present invention is generally directed to a method and system for providing an implicit unknown value to user defined enumerated type data constructs in a Hardware Descriptive Language (HDL) system while maintaining the semantics of the language reference model. More specifically, the present invention is directed to a method and system operable during HDL design compilation and simulation for automatically and seamlessly creating an implicit unknown value in user defined enumerated data types and accounting for the implicitly defined unknown value in ensuring that the semantics of the existing code which depends on the enumerated type are not broken. Further, the present invention is operable to model power shutoff behavior of user defined enumerated type data constructs.

2. Description of the Related Art

Typically, in computer aided Hardware Descriptive Language (HDL) design, a user specifies certain elements or components of an integrated circuit and their behavior and timing elements. In HDL users generally define variables and structures that will be used to represent certain states or behaviors. Any given HDL design may have thousands of these variables or structures.

Ensuring that these variables or structures have all been properly initialized into a known state is very important. Individually checking to ensure that all variables or structures in an HDL design are properly initialized is an extremely laborious task and is indeed quite impractical.

Creators of HDL designs had to explicitly create an additional data state representing an uninitialized value. The creator would then need to ensure that every variable/structure was in this uninitialized state at instantiation. Each creator of an HDL design would then need to assess the impact of this additional state on the remainder of the code, taking into account the desired behavior of the design and ensuring that each addition of the uninitialized state didn't break the desired behaviors. For each behavior that would be broken, users/creators needed to modify the code to be compatible with the inserted uninitialized states.

A creator of an HDL design would then check the values of variables/structures to ensure that they were not in the uninitialized state. This would then imply that each variable/structure in the design had been properly initialized at some point. If a variable was still in an uninitialized state, then the creator would have to go back to the HDL design code and see where the problems were. Through many iterations, the user would remove these problems and a final/golden HDL code could be created.

This golden HDL code would then be simulated and once finally acceptable, the creator would then have to be modified to remove all references to the uninitialized state. All modifications to behaviors or functions that had been made to be compatible with the inserted uninitialized state would have to be removed. Then, this "golden" code, though highly modified would pass to synthesis to be fabricated. If any of the potentially thousands of variables or structures had been left with the additional uninitiated state, or any of the behaviors/methods/functions had been left in the altered state, then additional, extraneous hardware logic would actually be fabricated wasting large amounts of materials, costs, and time.

Therefore, users or designers who want to accurately model or simulate a device typically do not want to explicitly create HDL code themselves representing an imaginary or unknown value such as U or X. Defining constructs that include these unknown U or X values in the HDL design code, and neglecting to remove them before synthesis will result in the disadvantageous result of being synthesized into actual physical silicon chips and extraneous circuitry being built-in for these states that don't need to be kept track of in a designs hardware implementation.

Inasmuch as users don't want to have to create unknown or undefined values such as U or X, modify the existing code to accommodate them, then remove all undefined values and modified code, the task is left to the creator of the compiler and simulation software to implicitly generate these features and yet maintain compatibility with language requirements and compatibility with the individual user's/creator's code representing the hardware implementation of the design.

This presents a formidable challenge in HDL designs where potentially thousands of lines of code have already been generated. Compatibility therewith and with preexisting standards of the language must be maintained while attempting to predict what the user wants/needs to be able to model.

There is therefore a need for a method and system whereby an implicitly defined unknown literal value is created and maintained apart from a user's hardware descriptive language design code and yet compatibility is maintained with the Language Reference Model and the individual HDL design code.

There is therefore a need for a user to be able to automatically simulate different power states as applied to a design without creating extraneous code or extraneous circuitry to perform these tasks.

There is therefore a need for a user to be able to ensure that all variables/constructs are properly initialized without having to modify the HDL design code numerous times or risk generating wasteful logic.

SUMMARY OF THE INVENTION

An object of the present invention is to provide a system and method for automating simulation of power states in a Hardware Descriptive Language (HDL) design, preferably Very High Speed Integrated Circuits HDL (VHDL) designs.

Another object of the present invention is to provide a system and method for implicitly generating an Unknown literal value in a user defined enumerated type data construct.

It is yet another object of the present invention to provide a system and method for automatically accounting for an implicitly defined literal value while maintaining compliance with the VHDL Language Reference Manual (LRM).

It is yet another object of the present invention to provide a system and method for automatically creating an implicitly defined literal value in a user defined enumerated type data construct and automatically modifying a user's VHDL code to maintain the functionality that the user intended.

It is yet another object of the present invention to provide a system and method for automatically creating an implicitly defined literal value in a user defined enumerated type data construct to assist a user in ensuring that all data constructs have been properly initialized.

These and other objects are obtained by a method and system formed in accordance with the present invention. These and other objects are attained by a method and system formed in accordance with the present invention. The method includes receiving an HDL design file representing a hardware device. The HDL design file including at least one user defined enumerated type data construct defining a plurality of literal enumerated values, and having associated with the user defined enumerated type data construct a case statement and a plurality of predefined attributes. The HDL design file is then parsed to detect a user defined enumerated type data construct. A case statement referring to said detected data construct is identified. An additional literal enumerated value denoting the unknown state is inserted into the detected data construct, and a choice corresponding to the additional literal enumerated value is inserted, into the identified case statement.

Another exemplary embodiment provides a system for automatic provision of an unknown state in a user defined enumerated type data construct of a Hardware Description Language (HDL) tool in a computer. The system comprises a computer processor; a computer program configured to include software modules including: a compiling module having a parsing module, operable to identify a user defined enumerated type data construct, and a case statement referring to the user defined enumerated type data construct; and, an elaboration module, operable to modify: the identified data construct to include an additional literal enumerated value; and, the identified case statement to include a choice corresponding to the additional literal enumerated value.

Another exemplary embodiment provides a method comprising: receiving a source code, the source code including at least one user defined data structure defining a plurality of possible data states, and having a switch statement and an access function associated therewith; scanning the source code to detect the user defined data structure;
identifying a switch statement referring to said detected data structure and an access function associated with the detected data structure in the source code; associating an additional possible data state denoting the unknown state with the detected data structure; transforming the identified switch statement to include an additional branch corresponding to the additional possible data state; and, transforming the identified access function to allow compatibility with the detected data structure having the additional possible data state denoting the unknown state.

Yet another exemplary embodiment provides a computer program product for use with a computer, the computer program product comprising a tangible computer usable medium having a computer readable program code embodied therein for providing an unknown state in a user defined enumerated type data construct of a Hardware Description Language (HDL) system comprising: scanning an HDL code representing a hardware device to identify a user defined enumerated type data construct, a pre-defined attribute of the user defined enumerated type data construct, and a case statement referring to the user defined enumerated type data construct; modifying an identified user defined enumerated type data construct to include an additional literal enumerated value; modifying an identified case statement to include a choice corresponding to the additional literal enumerated value; and, modifying an identified pre-defined attribute of the user defined enumerated type data construct to ignore the additional literal enumerated value.

DESCRIPTION OF THE PREFERRED EMBODIMENTS

When designing electronic circuits and digital logic such as Application Specific Integrated Circuits (ASICs), System On Chips (SOCs), field programmable gate arrays (FPGAs) or other microelectronics, it is important to be able to accurately represent and document the circuit structure, interconnections, and elements, as well as spatial, temporal, and behavioral information aside from an actual physical embodiment of the circuit structure itself. Therefore, several high level languages to represent circuit structures have been developed, including Very High Speed Integrated Circuits Hardware Description Language (VHDL), Verilog, and systemC, as well as others.

These different languages or approaches to representing circuits have several features that differentiate them from standard procedural programming languages. Primarily, these languages have an integral and explicit representation of timing. Also, the ability to map parallel functionality of systems in more of a data-flow manner sets them apart from a procedural or strictly sequential ordering as in standard computer programming languages such as Basic, C, and Assembly. This data-flow design of a hardware language allows multiple elements to be processing simultaneously and to more accurately represent the behavior of silicon chips.

Digital logic circuits, generally only make use of 2 discrete states, typically 0 and 1 for binary, where 0 would generally be a low voltage, and a logical 1 would be represented by a higher voltage. Ternary logic allows for three states, typically 0, 1, and X or U to represent an unknown, or "don't care." Ternary logic can be very useful in the design of circuits.

It is important to be able to map data states other than merely 0 and 1 or true and false. For example, it is often important to map an unknown, U, or X, data state where the computer does not know what state the variable is in. This situation could arise in a simulated power down mode, when initialization has not occurred, or in the event of an error.

In some Electronic Design Automation (EDA) tools or data representations, it is useful for users or designers watching the data flow of the circuit being simulated to clearly notice if a variable is set to U or X. A variable that is unknown (U or X) alerts a user or circuit designer that a certain variable has not been initialized or that an error has occurred. Without initialization a variable is in an unknown state and so an expected behavior could potentially not be met.

In Verilog unknown (U or X) is inherently provided with certain data types such as bits, vectors of bits, integers, floating point, and strings as well as other known variable types. However, in VHDL the Very High Speed Integrated Circuit Hardware Description Language, an Unknown or X state is not provided. There is an Institute of Electrical and Electronics Engineers (IEEE) standard IEEE1164 library which, if included in a specific VHDL design file, can provide certain types of prepackaged variables with multi valued logic. However, it is often desirable for programmers not to use this standard IEEE1164 library inasmuch as it may introduce additional overhead, it may not support a particular desired behavior, it may not be optimized for the situation, as well as many other reasons.

It is often important for users performing a specialized task to create and define a specialized or customized data structure. One such specialized data structure that is highly customizable is a user defined enumerated type data construct. An enumerated data type allows the potential values to be defined or customized by the creator or programmer.

For example, if one were seeking to create a data structure to keep track of cards in a deck of cards, it may be useful for a programmer to create an enumerated data type called SUITS, and give them the following values or literals: the first value could be "Hearts" another SUIT value could be "Clubs," "Spades," or "Diamonds."

Thereby the value or literals of the enumerated type data construct used to keep track of suits could actually have the value "Hearts," "Clubs," "Spades," or "Diamonds." This is far more advantageous than, for example, using an integer value of 0 or 1, 2, 3 . . . etc. arbitrarily assigned to correspond to a suit and using a lookup table to translate values at run-time. Through the use of Enumerated type data constructs, the user is able to more directly and logically maintain relationships and automatically self-document the code for readability and future modification by himself and others.

In a user defined enumerated data type construct, such as SUITS, the individual states or possible values are called literals and might include: Hearts, Clubs, Spades, and Diamonds. For another example, a user defined enumerated type data construct for COLORS could include the literals: Red, Green, and Blue. In the examples above, SUITS and COLORS: Diamonds and Blue respectively are considered the right-most, or highest literal while Hearts and Red are respectively the left-most or lowest literals.

An exemplary VHDL user definition of an enumerated type data construct: type COLOR is (RED, BLUE, GREEN);
An exemplary VHDL user defined enumerated type with unknown inserted: type COLOR is (RED, BLUE, GREEN,_UNKNOWN_);

By enumerating these data types the programmer is more able to easily and directly analyze the system behavior by creating state maps or debugging the code. A program or design written using enumerated data types is much easier to debug as it is self-documenting. This self-documenting feature allows many benefits and advantages. For these reasons user defined enumerated type data constructs are widely used in modeling state machines.

In VHDL an enumerated type variable can ONLY have the enumerated data states, values, or literals that are defined for it. For example, the enumerated type COLORS discussed above can ONLY assume the values: Red, Green, or Blue. An enumerated type cannot have any other value such as yellow, or unknown; it can only represent the enumerated values.

If a user defined enumerated data type were to be representing a variable or signal of a computer or a microelectronics device, the variable or signal of enumerated data type may not always be ascertainable as a 0/1, hearts/clubs, or red/green. As the value of a variable is not always discernable, it may be said to be in an "unknown" state. For example, if a computer, having many variables has just been restarted and has not yet been initialized, the values of the variables are unknown. Inasmuch as HDL designers are attempting to simulate real-world behavior of hardware, it is advantageous to represent and be able to simulate these conditions. Therefore it can be seen that an extra value or literal to represent such an unknown state is desirable and advantageous.

One possible solution to this need for additional data states, such as "unknown," is that the users themselves could create a new literal for each user defined enumerated data type, such as, for example: the user could create an additional value in the COLORS enumerated data type above to represent "Yellow" or "Unknown."

However, this could be quite laborious as there could potentially be hundreds to thousands of these such variables in a complicated design. Further, if a user were to manually create an additional data state or literal in each such user defined enumerated type data construct, there are several more dramatic disadvantages to this, including: when this hardware descriptive language code including an extra literal in each user defined enumerated type data construct is synthesized and actually created into a physical hardware embodiment, the hardware embodiment would include extra logical elements to account for the extra variable signal states and indeed would be wasteful and inefficient, including logic circuits that are not needed.

Alternatively, the user's golden code would need to be modified to include X literals in all user defined enumerated type data constructs for compiling and simulations, but then removed at the last moment before synthesis. Such a practice of ad-hoc, divergent solutions to representing an unknown state promotes uncertainty and non-uniformity in software design inasmuch as each individual user, creator, and designer of integrated circuits or microelectronics must create and decide their own way of representing additional unknown data states or powered off states.

Rather, a more useful solution is to have the compiler of the hardware descriptive language such as VHDL automatically create an extra Unknown or powered off data state for the user automatically, seamlessly, and transparently to the user. In automatically creating data states that the users did not explicitly create, a compiler must be modified to recognize the need for this and automatically insert the additional data state; consider its ramifications or impact on the hardware descriptive language downstream throughout compilation and simulation stages; and modify the handling of the user defined enumerated type data constructs. It is indeed essential to ensure that the semantics of the existing code that depend on the enumerated type are not broken.

A compiler in accord with the subject Patent Application in a parsing stage first evaluates or parses the code of the HDL (the hardware descriptive language) design provided from the user and scans the code searching for all user defined enumerated type data constructs. In a preferred embodiment, this functional mode of providing for the unknown state is performed responsive to an indication from the user that such implicit definition and automatic handling is desired.

Upon locating a user defined enumerated type data construct, the compiler's parsing module then searches for dependencies on the identified user defined enumerated type data constructs. These dependencies, unless addressed appropriately, could potentially prohibit compilation, cause errors, or induce failure into a user's HDL design. Dependencies take the form of a case statement targeting a user defined enumerated type data construct, or a pre-defined attribute/function of the construct that operates on or retrieves values stored in the construct.

In one alternative embodiment, the pre-defined attributes/functions of the construct are not searched for in parsing, and are not modified during compilation, but are instead accounted for during a later simulation stage. The simulator itself will hide the implicit unknown values from design access operations such as design access operations of VHPI or any external C interfaces while allowing access to operations that intend to see the value for purposes of debugging or viewing simulation results. Two exemplary value access functions for debugging or viewing purposes are T'value(X) and T'image(X).

After the parsing stage, an elaborating portion of the compiler then inserts an additional Unknown value or literal in each of the user defined enumerated type data constructs identified during the parsing stage. There are several options where to place such an implicitly defined literal value of the user defined enumerated type data construct.

For example, the compiler could create a literal value of the user defined enumerated type data construct to the left-most location of the user defined enumerated type data construct. Opposingly, the literal value could be inserted to the right-most location or anywhere in-between.

A preferred embodiment of the invention of the subject Patent Application inserts the implicitly defined literal values of the user defined enumerated type data construct to the right-most position such that the remainder of the literal values of the user defined enumerated data type remain unmodified and the potential for downstream problems are reduced. Thereby when the computer or compiler enumerates the actual literal values it would generally start at the left most literal value assigning as such a 0, 1, 2, . . . etc. for each literal value in turn.

By inserting the implicitly defined literal value to the right-most position of the user defined enumerated type data construct, the enumerations of each of the literal values of the user defined enumerated type data constructs are left unchanged for most attributes, functions or processes that may act on the relative or absolute locations of the literals of the user defined enumerated type data construct. Additionally default initialization behavior is preserved. This right-most insertion of the implicitly defined literal reduces potential downstream implications of creating this implicitly defined literal value.

One downstream implication is a case statement, switch, or select statement which is used to loop and await a value of a targeted variable and then perform a defined task/branch/choice when the targeted variable assumes a particular state or literal.

An exemplary case statement targeting a user defined enumerated type data construct:
 case COLOR is
  when Red=> . . .
  when Blue=> . . .
  when Green=> . . .
 end case;

In the compilation stage, a case statement as shown above may generate an error if all of the enumerated literals of the user defined enumerated type data construct are not accounted for. However, during the EDA process, various state maps are made considering all possible states of a variable or data construct. Therefore, during state map generation, "when" statements in a case structure are evaluated and mapped. To ensure that the compilation of the case statement above succeeds, a "when" statement corresponding to the implicitly defined literal value is inserted. However, to ensure that this choice/branch or "when" action of the Unknown literal is not represented on a state map, the "when 'unknown'" resultant actions are omitted. This ensures that any state machines modeled with the case statements remain in the shut-off/corrupted/or unknown state until state elements are restored or the state machines are reset. This approach maintains VHDL semantics, satisfies the compiler, simulator, and various tools.

An exemplary case statement targeting a user defined enumerated type data construct with a choice/branch/when inserted to deal with the implicitly defined literal:
 case COLOR is
  when Red=> . . .
  when Blue=> . . .
  when Green=> . . .
  when_Unknown_=>
 end case;

Therefore, the compiler takes account of the additional, implicitly defined literal or value of the user defined enumerated type data construct. The compiler will need to identify such a case statement and add an additional case dealing with the implicitly defined literal or value but, care should be taken to maintain compatibility with the HDL language downstream.

As the example above demonstrates, several tools of an HDL integrated development environment (IDE), EDA, VHPI, or external C interfaces may monitor different variables/signals and show its state or compute a state map of the different potential states and the progressions therebetween. However, in such an automated approach to generated state maps of a variable such as the user defined enumerated data type, it must be considered that the implicitly defined literal or value has been added but is not an actual state to be monitored or represented in the state map. Therefore in automatically generating the state map of the enumerated user defined enumerated data type, this new literal or value must be ignored and a corresponding state must not be created, represented, or modeled. Inasmuch as the compiler scans through the VHDL source code representing the microelectronics or circuits of the device, it should be automatically considered that no state map should be made. Even though the case statement has an implicitly generated "when" value representing the implicitly defined literal of the user defined enumerated type data construct, such a value or literal should not be represented in a state map.

Similarly to the case statement, a user defined enumerated type data construct has several attributes or member functions to manipulate, evaluate and retrieve values or perform some operation on the values stored in the user defined enumerated type data construct. Care must be taken with these attributes or functions of the data construct as well to maintain VHDL semantics and compatibility.

For example, several predefined attributes or functions related to the user defined enumerated type data construct include the following design access attributes that will be modified to not see the presence of the implicit unknown literal:

T'right: The T'right attribute generally returns the right-most literal value defined for a user defined enumerated type data construct. However, this attribute or function must be modified (at compiler or simulation stage) in the presence of an implicitly defined literal value so as to ignore the implicitly defined literal value and not return it when the attribute is called and instead only return a valid literal value.

In this case, the implicitly defined literal is not returned, but instead, it is offset by one to the left literal data value. Therefore, the T'right attribute or function must be modified automatically by the compiler or the simulator such that it automatically ignores the right-most literal or implicitly defined literal value. To accomplish this the T'right attribute or function may be simply modified in the elaboration stage of the compiler to return the explicitly defined literal value left one position from the right-most implicitly defined literal value.

T'high: Similar to the T'right attribute is the T'high attribute which returns the highest literal value of the user defined enumerated type data construct. In that regard T'high is very similar to the T'right attribute or function inasmuch as the right most value is the highest value. Therefore, to accommodate the implicitly defined literal value of the user defined enumerated type data construct, the T'high function would not return the highest value which is the implicitly defined literal value but would instead return the penultimate literal.

T'pos(X): Another attribute or function of a user defined enumerated type data construct that must be appropriately accounted for in the case of an implicitly defined literal appended to the user defined enumerated type data construct, is the T'pos(X) attribute. The T'pos(X) attribute returns the position number of the value of the parameter. A run-time error may be reported or thrown if the parameter of the T'pos(X) attribute evaluates to the implicitly defined literal value as this would imply that the user defined enumerated type data construct is in an unknown state or is behaving unpredictably. Checking the position number of the implicit literal would not contribute any value during the run-time and so an error should be reported which may be controllable through the simulators tool command language (TCL) interface. The warning may be controlled through the simulator's TCL interface to give the user an option to turn it off when required.

T'val(X): The T'val(X) is an attribute of the user defined enumerated data type that acts inversely to the T'pos (X) attribute. The T'val(X) takes an integer parameter where the integer parameter could be 0, 1, 2 . . . etc. The T'pos(X) returns the literal value corresponding to the position indicated by the integer parameter X. In a preferred embodiment, an error will be thrown if the result of the T'val(X) does not belong in the range defined by the attributes T'low to T'high. Since the implicit literal is not considered to be in this range as it is at the right-most value and is indeed only an implicitly defined literal value it is essentially ignored in the evaluation of the range of literal values through the use of the two attributes of the user defined enumerated data type construct as discussed supra: T'low and T'high and therefore it would be an error if the integer parameter points to the position of the implicit literal.

T'succ(X): The T' succ(X) attribute takes a parameter X which is an expression of the enumerated type data construct and returns a literal value whose position number is one greater than the evaluated parameter value. So essentially a user or designer may input a value in the T'succ(X) function and the succeeding literal value would be returned to the user. An error will be thrown if the parameter X=T'high or if the parameter X does not belong to the range T'low-T'high. Inasmuch as the implicit literal is considered outside of the range defined by the attributes T'low-T'high, a succeeding value cannot be returned. The implicit literal would be considered outside of this range (as it is right-most) and an error would be thrown if X evaluates to the implicit literal.

T'pred(X): Another attribute or function whose operation with an implicitly defined literal right-most value must be evaluated and appropriately accommodated is the T'pred(X) attribute. The T'pred(X) attribute takes a parameter X which is an expression of the enumerated type and returns a literal value whose position number is one less, or preceding the evaluated parameter value X. An error should be thrown if the parameter X is equal to T'low or if X does not belong to the range T'low to T'high. Inasmuch as the implicit literal is considered outside of this range, it would be an error if X evaluates to the implicit literal. Therefore T'pred (X) must be suitably amended to deal with the implicitly defined literal value of the user defined enumerated type data construct.

T'leftof(X): Another attribute or function to be considered and amended in the present situation where an implicitly defined literal value is present in the user defined enumerated type data construct is T'leftof(X). The T'leftof (X) attribute takes a parameter expression whose type is the base type of the enumerated type and returns the value that is to the left of the parameter in the range of the enumerated type. An error is thrown if the parameter X=T'left or if X does not belong to the range T'low-T'high. Inasmuch as the implicit literal is considered outside of this range it would be an error if X evaluates to the implicit literal and therefore the T'leftof(X) must be modified accordingly.

T'rightof(X): Another attribute or function of a user defined enumerated data type construct that must be amended or suitably modified to account for the implicitly defined literal value is the T'rightof(X) attribute. The T'rightof (X) attribute takes a parameter expression whose type is the base type of the enumerated type and returns the value that is to the right of the parameter in the range of the enumerated type. Therefore an error will occur if the parameter X of the T'rightof(X) function equals or evaluates to T'right or if X does not belong to the range defined by the attributes T'low to T'high. Because the implicitly defined literal value is considered to be outside of this range, an error will be thrown if the parameter X of the T'right of (X) attribute evaluates to the implicit literal.

Opposingly, the following pre-defined attributes are considered to be value access attributes and may return or have an argument that evaluates to the implicit unknown value itself:

T'image(X): Another attribute or function of the user defined enumerated data type is the T'image(X) attribute or function. The T'image(X) attribute ordinarily takes a parameter X that is an expression of the enumerated type and returns a string representation of that value.

To accurately model a power aware or a power down state, the T'image (X) attribute or function should be modified such that the user is able to call this attribute or function of the user defined enumerated type data construct and be able to see the value. This would allow users or designers to be able to evaluate whether a given variable or data element of the data construct was in an X or unknown data state which would then suggest that the proper initialization had not been completed and a certain variable or data element is still in an unknown or X data state.

In a preferred embodiment, a run-time warning is reported if X evaluates to the unknown implicit literal. The warning may also be controlled through the simulator's tool command language (TCL) interface to give the user an option to turn it off when required.

T'value(X): Another attribute or function of the user defined enumerated data type construct is T'value(X). This attribute operates as an inverse of the T'image(X)

attribute. The T'value(X) attribute takes a string parameter and returns the literal value that matches the string representation.

As with the T'image(X) attribute, the T'value(X) attribute ideally reports a run-time warning if the string representation matches with the implicit literal. This allows the user to evaluate the value of a user defined enumerated type data construct.

For example, a user could query or evaluate whether the T'value(X) attribute were to be equal to an unknown U, X, 0 or so forth. This could allow a user to check the value and therefore proceed accordingly. If the evaluated value is as expected, the program may be able to proceed; whereas if the evaluation were to return/throw off a run-time warning, error, or interrupt, then a user or designer would know that an initialization sequence had not been accomplished and that there are therefore problems which need to be addressed.

As the implicitly defined literal value is inserted to be the right-most literal value of the user defined enumerated type data construct, attributes or functions of this user defined enumerated type data construct such as T'left or T'low will not need to be modified in a corresponding manner to their opposite counterparts T'right and T'high respectively, as discussed above. Indeed a major benefit of this approach of implicitly defining, automatically generating, and modifying code to accommodate this right-most literal value of the user defined enumerated type data construct is that no accommodations need to be made for the left-most or the lower-most literal. The left most literal value all the way up to the penultimate literal value (preceding the right-most) are all able to be maintained unchanged. No modification or divergent treatment need be accorded those literals.

Some remaining modifications or accommodations for the implicitly defined literal value of the user defined enumerated data type include VHDL Programming Language Interface Task Force (VHPI) design and value access. Where the user is making use of VHPI design access mechanisms, the implicit enumerated literal value needs to be hidden. When accessed through these VHPI design access mechanisms, the implicitly defined literal should be discounted. However, value access routines may return the implicit literal value. This allows the user to see the implicit value which could be an X or U or some indicia that the variable or parameter has not been initialized and is still in an unknown or undefined state which could lead to problems.

Similar to the VHPI tool access mechanisms, the Tool Command Language (TCL) and graphical waveform viewers or simulation waveform viewers access commands should be able to return the implicit literal. The implicit literal value should be specially marked in a waveform data base to enable simulation waveform viewers to show these as a special color that is used for displaying Xs or unknowns. This allows the user when viewing, in a meta or macro manner, the waveforms of the different variables or data states of the simulated circuit to be able to quickly recognize and interpret the different data values of the implicitly defined literal values of the user defined enumerated data type such that a user is able to quickly recognize errors or a lack of initialization in a return from a power off state.

In various embodiments of the invention, the system may be implemented in the form of software modules or hardware modules. In an embodiment of the invention, the system is implemented as part of an Electronic Design Automation (EDA) or VHDL software suite.

Figure 1:
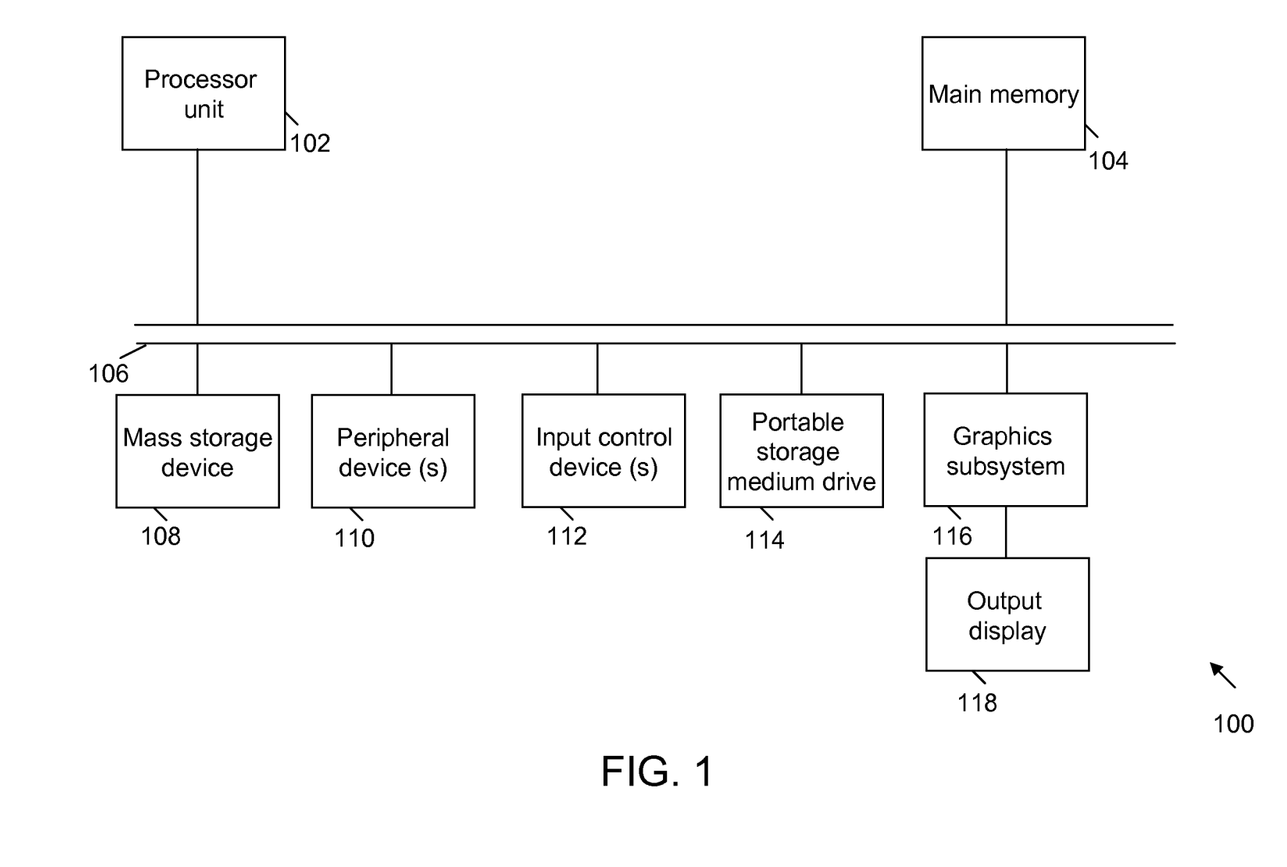
FIG. 1 is a block diagram of a system for implicitly generating an extra literal value of a user defined enumerated data type construct in accordance with one embodiment of the present invention.

FIG. 1 illustrates a block diagram of a computer system for executing VHDL design and simulation, in accordance with various embodiments of the present invention. A computer system 100 contains a processor unit 102, a main memory 104, an interconnect bus 106, a mass storage device 108, peripheral device(s) 110, input control device(s) 112, portable storage medium drive(s) 114, a graphics subsystem 116, and an output display 118. Processor unit 102 may include a single microprocessor or a plurality of microprocessors for configuring computer system 100 as a multi-processor system. Main memory 104 stores, in part, instructions and data to be executed by processor unit 102. Main memory 104 preferably includes banks of dynamic random access memory (DRAM) as well as high-speed cache memory.

For the purpose of simplicity, all the components of computer system 100 are connected via interconnect bus 106. However, computer system 100 may be connected through one or more data transport means. For example, processor unit 102 and main memory 104 may be connected via a local microprocessor bus; and mass storage device 108, peripheral device(s) 110, portable storage medium drive(s) 114, and graphics subsystem 116 may be connected via one or more input/output (I/O) buses. Mass storage device 108, which may be implemented with a magnetic disk drive, an optical disk drive, a solid state device, or an attachment to network storage, is a non-volatile storage device for storing data and instructions, to be used by processor unit 102. In the software embodiment, mass storage device 108 may store the software to load it to the main memory 104.

Portable storage medium drive 114 operates in conjunction with a portable non-volatile storage medium, such as a floppy disk, a compact disc read only memory (CD-ROM), or a digital versatile disc read only memory (DVD-ROM), to input and output data and code to and from the computer system 100. In one embodiment, the software is stored on such a portable medium, and is input to computer system 100 via portable storage medium drive 114. Peripheral device(s) 110 may include any type of computer support device such as an input/output (I/O) interface, to add additional functionality to computer system 100. For example, peripheral device(s) 110 may include a network interface card, to interface computer system 100 to a network.

Input control device(s) 112 provide a portion of the user interface for a computer system 100 user. Input control device(s) 112 may include an alphanumeric keypad for inputting alphanumeric and other key information; and a cursor control device such as a mouse, a trackpad or stylus; or cursor direction keys.

In order to display textual and graphical information, computer system 100 contains graphics subsystem 114 and output display(s) 118. Output display 118 may include a cathode ray tube (CRT) display, liquid crystal display (LCD), plasma, or active matrix organic light emitting diode (AMOLED) display. Graphics subsystem 116 receives textual and graphical information, and processes the information for output to display 118.

In a software implementation, the EDA or VHDL software includes a plurality of computer executable instructions, to be implemented on a computer system. Prior to loading in a computer system, the EDA or VHDL software may reside as encoded information on a computer-readable tangible medium such as a magnetic floppy disk, a magnetic tape, CD-ROM, DVD-ROM, flash memory, or any other suitable computer readable medium.

In a hardware implementation, the invention may comprise a dedicated processor comprising processor instructions for performing the functions described herein. Circuits may also be developed to perform these functions.

Figure 2:
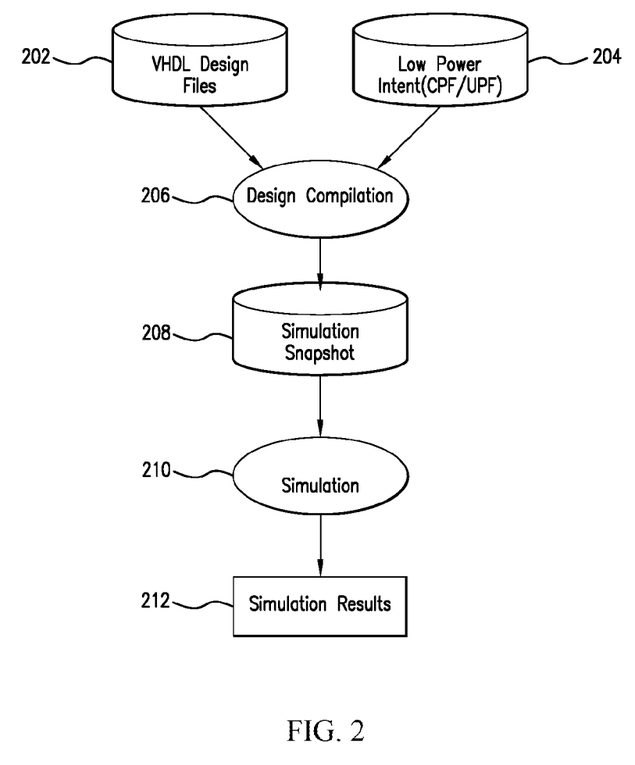
FIG. 2 is a flow diagram of a method for automatically generating an implicit literal value in user defined enumerated data type.

FIG. 2 is a simplified flow diagram of a method for automatically generating an implicit literal value in a user defined enumerated type data construct in accordance with an embodiment of the invention of the subject Patent Application. Very High Speed Integrated Circuit Hardware Description Language (VHDL) files 202 describing an integrated circuit and associated behavioral, temporal, and spatial relations are input to a design compilation stage or module 206.

Optionally, a Low Power Intent file 204 may be provided along with the VHDL design files to the compilation stage or module. The low power intent may be in Common Power Format (CPF), Unified Power Format (UPF), or any other standard that may develop.

Design compilation module 206 is shown in simplified form, but may include at least two sub stages or sub-modules including: Parsing and Elaboration. Typically a compiler will ultimately transform a high language source code into another lower level computer language such as assembly language or machine code. However, in a hardware compiler such as compilation module 206, the VHDL design code will be compiled to logic, typically in the form of a netlist if the design is ready for fabrication. If the VHDL design must still undergo simulation, the compiler will output a simulation snapshot 208 or other temporary file to be used in simulation 210.

The parsing stage or sub-module is operable for scanning and analyzing the VHDL design file to check for correct syntax among other tasks. In the invention of the subject Patent Application, the parser will additionally search for all occurrences of a user defined enumerated type data construct, all case statements, and (optionally) pre-defined attributes which will need to be modified to accommodate the user defined enumerated type data constructs. The parser may perform in a single iteration or in multiple iterations.

The elaboration stage targets the user defined enumerated type data constructs, case statements, and optionally attributes of the user defined enumerated type data constructs identified in the parser stage of the design compilation 206 module or step. The elaboration stage or sub-module will then insert an additional literal or possible value into each definition of a user defined enumerated type data construct. In a preferred embodiment, this literal or possible value is inserted in the right-most position of the definition. The literal or possible value will preferable be defined as "_UNKNOWN_", or simply "unknown".

For each identified user defined enumerated type data construct, the elaboration stage or sub-module will insert a "when" choice corresponding to the "_UNKNOWN_" implicitly defined literal into any "case" statements that consider the user defined enumerated type data construct.

In one embodiment, the elaborator will modify all pre-defined attributes of the user defined enumerated type data constructs to ignore the presence of the implicitly defined literal. Alternatively, the pre-defined attributes are not modified by the elaborator or compiler, but are instead specially treated during simulation.

Once the elaboration module or sub-stage has completed, the compiler will output a simulation object file referred to as a simulation snapshot 208. A simulator 210, such as NCSim, will load the simulation snapshot 208 and simulate actual operation of the device. The simulation stage or module 210 will output simulation results 212 which may be used to further revise the design of the device.

Figure 3:
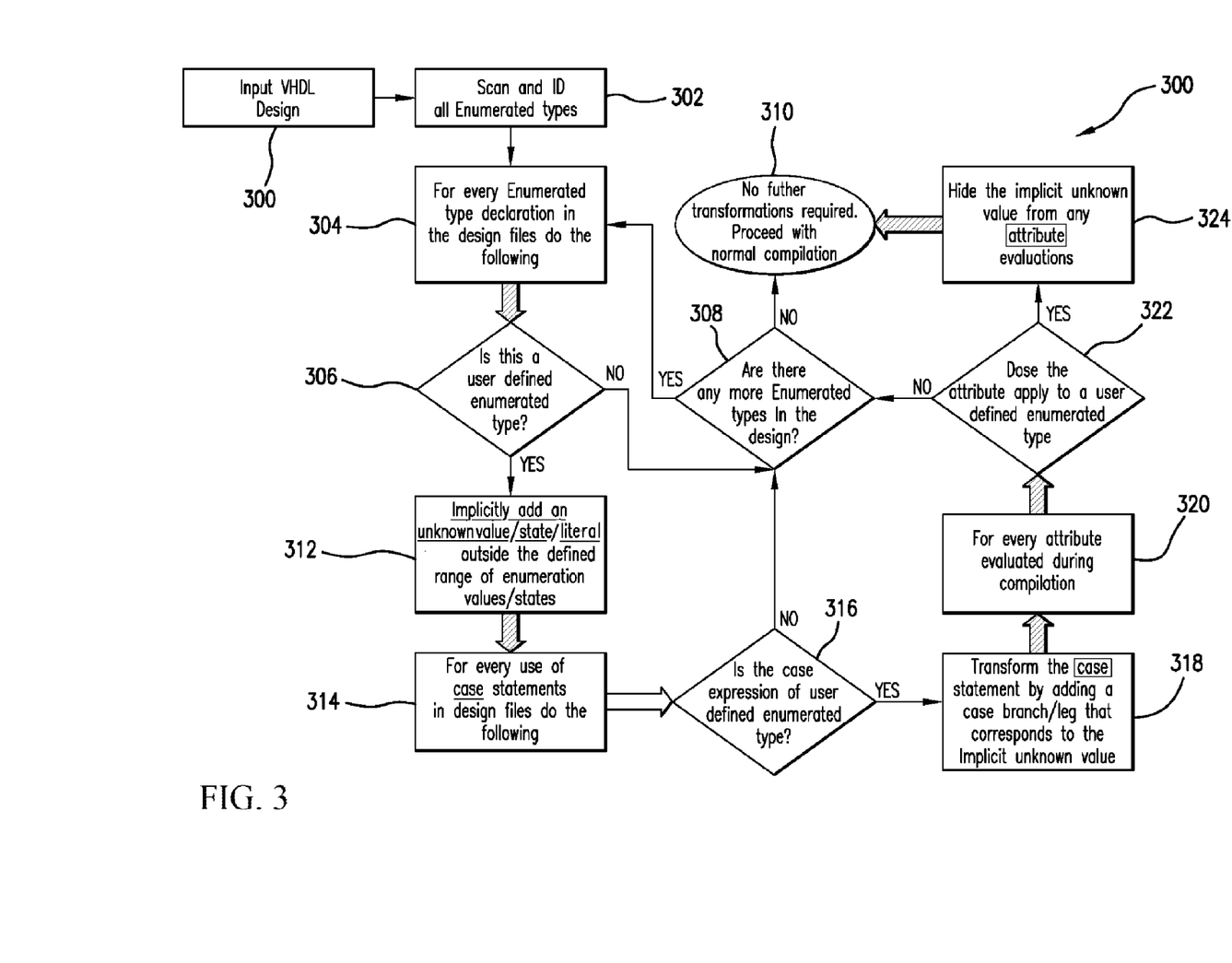
FIG. 3 is a schematic diagram of a method for modifying code of an HDL design to maintain compatibility with the implicitly generated literal value.

FIG. 3 illustrates a schematic diagram of a method for modifying code of an HDL design to maintain compatibility with the implicitly generated literal value. At step 300, a VHDL design file is input. At step 302 the VHDL design file is scanned for all occurrences of enumerated type data constructs. All occurrences are identified and logged or suitably recorded to allow them to be revisited at the elaboration stage of compilation.

At step 304 a loop is established for each enumerated type declaration in the design files to evaluate whether it is a user defined enumerated type. If a user defined enumerated type data construct is found, the method proceeds to step 312 and an implicitly defined unknown value/state/literal that falls outside the defined range of enumeration values/states/literals is added to the user defined enumerated type data construct.

The method then proceeds to step 314 where every use of case statements are evaluated at step 316 to determine if the case expression references a user defined enumerated type data construct. If the case expression does reference a user defined enumerated type data construct, then control proceeds to step 318. At step 318 the case statement referencing the user defined enumerated type data construct is transformed by adding a case branch/leg/choice/"when" statement that corresponds to the implicit unknown value and control passes to step 320.

At step 320 and 322, each attribute is evaluated to see if the attribute applies to a user defined enumerated type. If the attribute does apply to a user defined enumerated type then the implicit unknown value is hidden from any attribute evaluations. Once each such transformation has been completed and no further enumerated type data constructs remain to be evaluated 308, control proceeds to step 310 and proceeds to creation of a simulation snapshot 208 as seen in FIG. 2 which will be passed to the simulator 210 of FIG. 2.

In the simulator 210 of FIG. 2, the simulator will accept the simulation snapshot 208 and will deposit the implicit unknown value to objects of user defined enumerated types during power shutoff. The implicit unknown value will represent the shutoff state of the object. Therefore all user defined enumerated type data constructs will stay in an unknown state until they are properly initialized. This allows a designer or observer of the simulation in a simulation waveform viewer to notice that the state of a data construct/variable/signal is in an "unknown" state and assume that initialization has not occurred properly. This enables the red-flagging of potential issues and assists in further revisions of the VHDL design.

The simulator will hide the implicitly defined literal unknown value from design access operations, which includes, but is not limited to design access operation of VHPI or any external C interfaces. In a preferred embodiment, the implicit literal unknown value is shielded from being represented as a valid part of the design. This is, among other reasons, to prevent extraneous logic hardware from being created during synthesis.

However, any operations that intend to see the value for purposes of debugging or viewing simulation results will be allowed to see this value. The same logic applies to predefined attributes that are evaluated during simulation time. The following attributes are considered design access attributes and will not see the presence of the implicit unknown literal/value: T'LEFT, T'RIGHT, T'HIGH, T'LOW, T'POS(X), T'VAL(X), T'SUCC(X), T'PRED(X), T'LEFTOF(X), T'RIGHTOF(X).

The following predefined attributes are considered to be value access attributes and may return or have an argument that evaluates to the implicit unknown state/value/literal: T'IMAGE(X), and T'VALUE(X).

Thereby such a compiler may compile a user defined enumerated data type automatically and implicitly without the user needing to intervene or create special structures to deal with such an implicitly defined and created literal value of the user defined enumerated type data construct. Such a compiler should take a client's VHDL code and scan it looking for the user defined enumerated data type and then modify accordingly on a temporary file/stream of data/or simulation snapshot 208 of the VHDL code prior to translating it or contemporaneous with the creation of the machine code representing the VHDL code of the hardware device.

Thereby a user with minimal creation or planning may have an automatically created, defined, and handled unknown variable representing a power-off state or simply an unknown state of the value. This aids the designers of the VHDL design in enabling them to accurately model without any intervention, planning, or special modification of code to model such a state. Thereby the compiled VHDL code has necessary structures, attributes, and functions to deal with simulating an Unknown state without any special coding by the user.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation flows or processing steps may be reversed or interposed, all without departing from the spirit or scope of the invention as defined in the appended claims.

What is claimed is:

1. A method for automatically providing for an unknown state in a user defined data structure implemented in a computer system, comprising:

receiving a source code, said source code including at least one user defined data structure selectively set to one of a plurality of predefined data states associated therewith, and having a switch statement and an access function associated therewith;

scanning said source code to detect said user defined data structure;

identifying a switch statement referring to said detected data structure and an access function associated with said detected data structure in said source code;

associating with said detected data structure an additional data state denoting the unknown state indicative of said detected data structure being maintained without one of said predefined data states;

transforming said identified switch statement to include an additional branch corresponding to said additional data state; and, transforming said identified access function to allow compatibility with said detected data structure having said additional data state denoting the unknown state.

2. The method for automatically providing for an unknown state in a user defined data structure implemented in a computer system, as defined in claim 1, wherein said transforming said identified access function to allow compatibility conceals the presence of the additional possible data state of said detected data structure to access functions other than diagnostic access functions.

3. The method for automatically providing for an unknown state in a user defined data structure implemented in a computer system, as defined in claim 1 wherein said source code, said detected data structure associated with an additional data state, said transformed switch statement, and said transformed access function are further compiled into an executable computer file.

4. A method for automatically providing for an unknown state in a user defined enumerated type data construct implemented in a computer system, comprising:

receiving a source code, said source code including at least one enumerated type data construct selectively set in value to one of a plurality of a predefined set of data states associated therewith, and having a switch statement and an access function associated therewith;

scanning said source code to detect said user defined data construct;

identifying a switch statement referring to said detected data construct and an access function associated with said detected data construct in said source code;

expanding said predefined set of data states to associate with said detected data construct an additional data state denoting the unknown state indicative of said detected data construct being maintained in value without one of said predefined data states;

transforming said identified switch statement to include an additional branch corresponding to said additional data state; and, transforming said identified access function for compatibility with said detected data construct having said additional data state denoting the unknown state.

5. The method for automatically providing for an unknown state in a user defined enumerated type data construct implemented in a computer system as recited in claim 4, wherein said transforming said identified access function to allow compatibility conceals the presence of the additional data state of said detected data construct to access functions other than diagnostic access functions.

6. The method for automatically providing for an unknown state in a user defined enumerated type data construct implemented in a computer system as recited in claim 4 wherein said source code, said detected data construct associated with an additional data state, said transformed switch statement, and said transformed access function are further compiled into an executable computer file.

* * * * *

UNITED STATES PATENT AND TRADEMARK OFFICE
CERTIFICATE OF CORRECTION

| | | |
|---|---|---|
| PATENT NO. | : 8,997,068 B1 | Page 1 of 1 |
| APPLICATION NO. | : 13/952099 | |
| DATED | : March 31, 2015 | |
| INVENTOR(S) | : Kanungo et al. | |

It is certified that error appears in the above-identified patent and that said Letters Patent is hereby corrected as shown below:

In the Claims:

Column 16, Line 3, Claim 2, "the additional possible data state" should read -- the additional data state --.

Signed and Sealed this
Seventh Day of July, 2015

Michelle K. Lee
*Director of the United States Patent and Trademark Office*